United States Patent [19]
Roncato et al.

[11] Patent Number: 5,454,846
[45] Date of Patent: Oct. 3, 1995

[54] PROCESS AND DEVICE FOR MAKING UP A COMPOSITE THREAD

[75] Inventors: Giordano Roncato, Aix-Les-Bains; Dominique Loubinoux, Chambéry; Philippe Boissonnat, Barby, all of France

[73] Assignee: Vetrotex France S.A., Chambery, France

[21] Appl. No.: 152,554

[22] Filed: Nov. 12, 1993

[30] Foreign Application Priority Data

Nov. 19, 1992 [FR] France .................................. 92 13884

[51] Int. Cl.⁶ .............................................. C03B 37/03
[52] U.S. Cl. .................................. 65/381; 65/442; 65/486; 65/500; 65/529; 264/211.12
[58] Field of Search ....................... 65/1, 2, 4.1, 4.3, 65/438, 442, 453, 381, 486, 500, 502, 529, 535; 264/211.12, 171, 174

[56] References Cited

U.S. PATENT DOCUMENTS

| | | | |
|---|---|---|---|
| 3,032,813 | 5/1962 | Stalego | 65/4.3 X |
| 3,269,818 | 8/1966 | Tiede | 65/4.3 X |
| 3,939,639 | 2/1976 | Ellegast | 57/157 |
| 3,955,952 | 5/1976 | Drummond | 65/4.3 X |
| 4,774,042 | 9/1988 | Schippers | 265/103 |
| 5,011,523 | 4/1991 | Ronacato et al. | 65/2 |

FOREIGN PATENT DOCUMENTS 0505274  9/1992  European Pat. Off. ......... D01D 5/12

OTHER PUBLICATIONS

Anter Laboratories, Inc. Linear Thermal Expansion Data Sheet 1988.

Primary Examiner—Peter Chin
Assistant Examiner—John Hoffmann
Attorney, Agent, or Firm—Pennie & Edmonds

[57] ABSTRACT

An apparatus and process for the production of a composite thread of glass and of organic material wherein continuous filaments of thermoplastic organic material are mixed in the form of a sheet with a bundle or sheet of glass filaments, with the speed of the thermoplastic filaments during their penetration into the bundle or sheet of glass filaments being greater than the speed of drawing of the glass filaments.

13 Claims, 5 Drawing Sheets

PROCESS AND DEVICE FOR MAKING UP A COMPOSITE THREAD

BACKGROUND OF THE INVENTION

This invention relates to a process and a device for producing a composite thread, formed by the association of a multiplicity of continuous glass filaments and of continuous filaments of thermoplastic organic material. The production of such a composite thread is described for example in U.S. Pat. No. 5,011,523. The '523 patent describes installations comprising a die, from which are drawn continuous filaments of glass, and a drawing head, supplied under pressure with a thermoplastic organic material, for delivering continuous organic filaments. The two types of filaments may be in the form of sheets, or of sheet and thread, during their assembling together. One advantageous form of embodiment described in the '523 patent consists of surrounding the filaments or thread of glass with organic filaments as they are combined together. A composite thread formed in this manner has the advantage of protecting the glass filaments from friction against the solid surfaces with which the composite thread comes into contact. On the other hand, this arrangement does not favor perfect homogenization of the mixture of the two types of filaments. In fact, a cross-section through the composite thread shows preferential zones for each type of filament, which may be a desired method of assembly for certain applications.

Furthermore, these composite threads possess an undulation. This is very evident when the threads are present in the form of spools, because the spools exhibit undulations around their entire periphery. This undulation of the composite thread is, in fact, due to a shrinkage phenomenon of the organic filaments within a composite thread which causes an undulation of the glass filaments. This phenomenon has various disadvantages. In the first place, it requires thick core tubes for making the spools, so that they shall withstand the binding effect exerted by the composite thread. Moreover, the unwinding from the spool becomes very difficult by reason of the changes in geometry. This form of presentation of the thread may be advantageous where, for example, it forms part of the structure of a fabric which will later serve for reinforcing a curved component. The flexibility of the fabric, imparted to it both by the aptitude for deformation of the organic filaments and the undulation of the glass filaments, makes it easier to position in a mould. In contrast, for the production of composite threads intended for the manufacture of plane components reinforced in one direction, this presentation is a handicap. Since the filaments are not aligned in the final composite, their reinforcing capability in one specific direction is reduced.

SUMMARY OF THE INVENTION

The present invention involves a process for the manufacture of a composite thread which shall not exhibit any undulation during its formation and which shall remain stable in time. This is accomplished by a production process of a composite thread formed by the association of continuous glass filaments issuing from a die and of continuous filaments of thermoplastic organic material issuing from a drawing head, in which the thermoplastic filaments are mixed in the form of a sheet with a bundle or sheet of glass filaments with a speed, during their penetration into the bundle or sheet of glass filaments, that is greater than the speed of drawing of the glass filaments.

According to one preferred method of the invention, the thermoplastic filaments are projected in the form of a sheet onto a bundle or sheet of glass filaments. It is also possible to guide the thermoplastic filaments in the form of a sheet right up to the bundle or sheet of glass filaments.

The process of the present invention makes it possible to produce, for a first time, a mixing or embedding of undulating thermoplastics threads among the glass filaments. The shrinkage phenomenon is sufficiently rapid to be completed before the composite thread is wound onto a support. The difference established between the speed of the organic filaments and the drawing speed of the glass filaments is a function, notably, of the nature of the thermoplastics material used and of the diameter of the organic filaments. Generally, this difference is determined in such a way that the shrinkage phenomenon compensates the excess of initial length of the organic filaments compared with the length of the glass filaments. Provided that all the filaments which make up the composite thread are perfectly aligned at the instant of winding into a spool, the spool produced no longer has any of the undulations previously encountered. For this reason it is no longer necessary to use thick core tubes which previously had to withstand the compression resulting from the binding effect caused by the shrinkage. Instead, it is possible to use ordinary core tubes, which can even be removed after the spools have been formed, the spools then becoming balls or clews of thread. This is advantageous because it is then possible to use the composite threads in accordance with the principle of unwinding from the outside or pulling out from the inside. It is also possible in this case to reuse the core tubes several times, which represents a saving.

Another advantage of this process is to ensure homogeneity of the composite thread which is better than that achieved by the methods of manufacture that consist of drawing a glass fiber or a sheet of glass filaments surrounded by thermoplastic filaments.

In one embodiment of the invention, the mixing of the thermoplastic filaments with the glass filaments takes place between the base of the die for the glass filaments and an associated coating roller. The assembling together of the thermoplastic filaments and of the glass filaments then takes place within the volume defined by the bundle of glass filaments and thus ensures excellent homogenization.

In a second embodiment of the invention, the mixing together of the thermoplastics filaments and the glass filaments takes place on the contact line of the glass filaments with the coating roller. This contact line corresponds, in fact, to the generatrix of the coating roller onto which the glass filaments pass.

In a third embodiment of the invention, the mixing together of the thermoplastics filaments and the glass filaments takes place on the downstream of the coating roller. The glass filaments in this case are no longer spread out in the form of a volume but in the form of a flat sheet. The assembling of the two types of filaments therefore takes place in a plane. This type of association also allows very good homogenization and enables any risk of degradation of the glass filaments during projection to be eliminated.

It may, however, sometimes be of advantage to regulate the speed of the organic filaments to a value such that their excess length compared with the length of the glass filaments is not entirely compensated by the shrinkage. It is thus possible to produce composite threads, in which the glass and thermoplastic filaments are linear, or again composite threads in which the glass filaments are linear and the thermoplastic filaments are undulating, in a manner that can vary. In this way it is possible to produce a more or less bulky thread which may, notably, be used for the production of fabrics.

According to a preferred embodiment of the invention, a speed of the thermoplastic filaments is chosen in such a way as to obtain the desired volume of the composite thread.

The invention also proposes a device enabling this process to be carried out.

According to the invention, in order to make possible the production of a composite thread formed by the association of continuous filaments of glass and of continuous filaments of thermoplastic organic material, the device comprises, on the one hand, an installation containing at least one die supplied with glass, the lower face of which is provided with a multiplicity of orifices. This die is associated with a coating roller. On the other hand, an installation comprising at least one drawing head is provided. The drawing head is supplied under pressure with molten thermoplastic material, and the lower face is provided with a multiplicity of orifices. This drawing head is associated with a variable speed drawing device of the type comprising drums, and with a means enabling the thermoplastic filaments to be mixed with the glass filaments. Finally, means common to both installations enabling the assembling together and spooling of the composite threads is provided.

Preferably, the means enabling two types of filaments to be mixed together is a device utilizing the properties of fluids which can be liquids or gases, such as air, either pulsed or compressed. It may, for example, be a Venturi device, the function of which is solely to project the thermoplastic filaments while giving them a suitable orientation and a suitable spatial distribution.

The layout of the die, of the drawing head, of the drum-type drawing device and of the device enabling the thermoplastic filaments to be mixed with the glass filaments, may be effected on a single level, in contrast to certain layouts of the prior art. For this purpose, it is possible to arrange a deflector element such as a roller between the drawing head for the organic material and the drum-type drawing device.

In another embodiment, it is possible to provide an element such as a baffle plate, disposed behind the glass filaments and opposite the projection zone for the thermoplastic filaments, that is, opposite the Venturi. This baffle element enables the passage of the thermoplastic filaments through the glass sheet to be limited.

The means enabling the two types of filaments to be mixed together may be constituted by the association of two rollers. A first guide roller, possibly a driving roller, orientates the sheet of thermoplastic filaments towards a second roller. On this second roller, the thermoplastic filaments become mixed with the glass filaments, also in the form of a sheet.

The present invention makes possible the production of composite threads from glass filaments and thermoplastic filaments, in which the latter arrive at the meeting place with the glass filaments at a speed greater than the speed of drawing of the composite thread.

BRIEF DESCRIPTION OF THE DRAWINGS

Other details and advantageous characteristics of the invention will become apparent below from the description of the examples of embodiment utilizing the invention, described with reference to the attached figures, of which:

In FIG. 1*a* there is also shown schematically a drawing head 7, from which the thermoplastic filaments 5 are extruded. The drawing head 7 may be supplied with a thermoplastic material stored, for example, in the form of granules, which is melted and then flows under pressure out of numerous orifices situated underneath the drawing head 7, to form the filaments 5 by drawing and cooling. The cooling of the filaments is performed by forced convection, such as by a conditioning device 8 having a shape adapted to that of the drawing head 7 and which generates a laminar air flow perpendicularly to the filaments. The cooling air is at a flow rate, temperature and moisture content that are kept constant. The filaments 5 then pass onto a roller 9, which, on the one hand, enables them to be assembled in the form of a sheet 10 and, on the other hand, changes their direction of travel. In this manner it is possible to arrange the die 1 and the drawing head 7 at a single level and thus to enable composite threads to be produced on sites where hitherto it was possible only to produce glass threads, without the need for major modifications, except the installation of a drawing station for thermoplastics. In fact, the devices already proposed for the production of composite threads require in general an entry for the glass thread or sheet of filaments above the thermoplastics die and therefore the location of the glass die at a higher level. This generally leads to a complete modification of the structure.

Figure 1A:
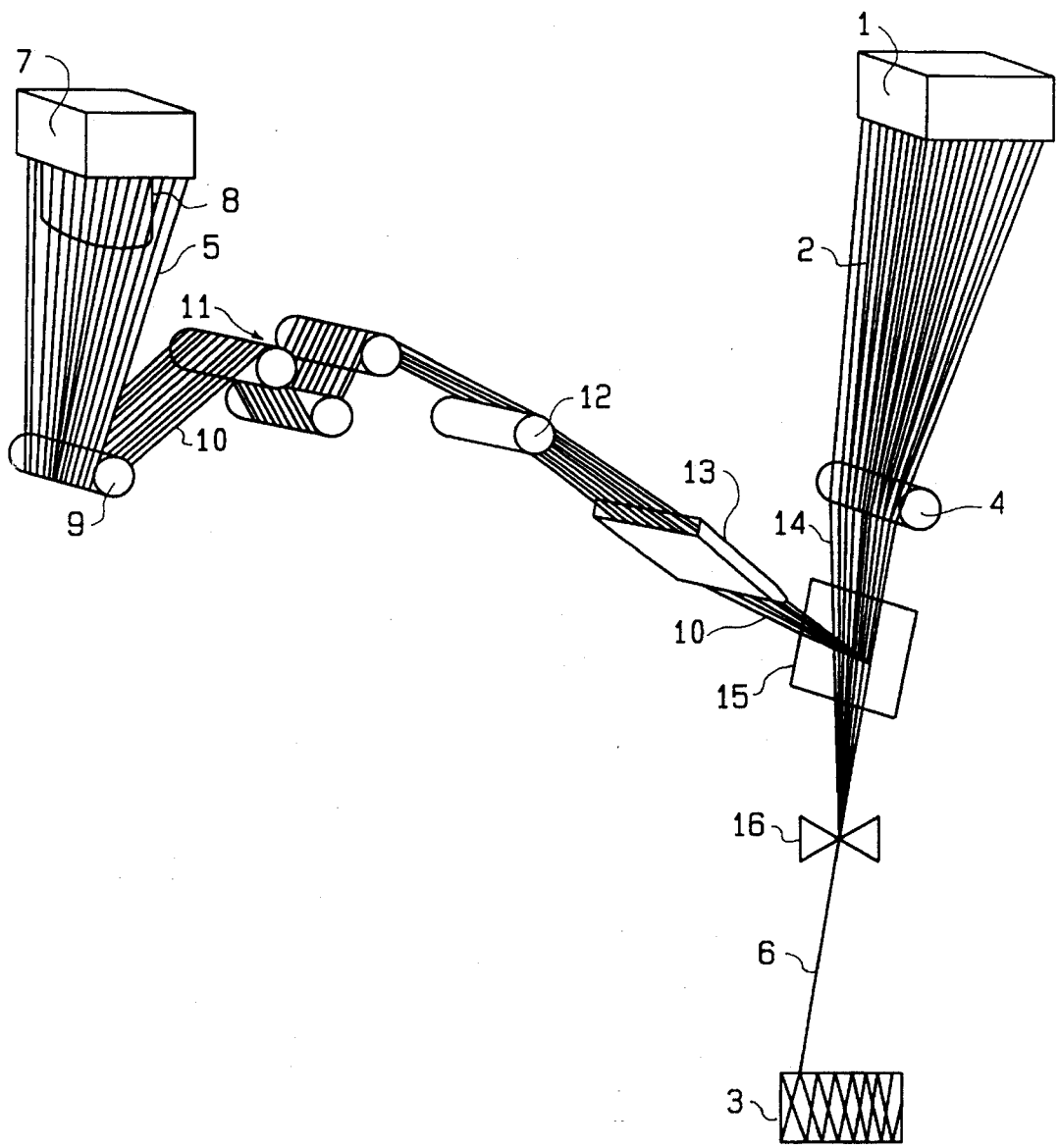
FIG. 1*a* shows a schematic view of a complete installation according to the present invention. A die 1 is supplied with glass either from the forehearth of a furnace which directly feeds the molten glass to its top, or by a funnel containing cold glass, for example in the form of balls, which falls by simple gravity. According to the one or other of these forms of supply, the die 1 is commonly of a platinum-rhodium alloy and is heated by Joule effect so as to remelt the glass or maintain it at a high temperature. The molten glass then flows in the form of a very large number of threads, drawn into the form of a bundle 2 of filaments by a device, not illustrated, which also enables the spool 3 to be formed, which will be discussed in more detail later. These filaments 2 then pass onto a coating roller 4, which deposits a size or coating substance onto the glass filaments. This coating substance may contain compounds, or their derivatives, constituting the thermoplastics filaments 5 which will be associated with the glass filaments to form a composite thread 6.

After passage around the roller 9, the sheet 10 of thermoplastic filaments passes over a drum-type drawing device 11, for example composed of three drums. These drums may rotate at the same speed or may have different speeds, so that the acceleration takes place in the direction of travel of the thermoplastic filaments. This drum-type drawing device 11 has the function of drawing the filaments 5 and also giving a specific determined speed to the sheet 10. It also enables a separation to be maintained between the drawing and winding tensions of the thermoplastic filaments 5. It is also possible to vary the speed of the drums very easily, in such a manner as to adjust very accurately the speed of projection of the thermoplastic material into the glass sheet 14.

The sheet 10 then passes over a device composed of a deflector roller 12 and of a Venturi device 13. This Venturi device 13 ensures the orientation and projection of the thermoplastic filaments in the form of a sheet 10 into the sheet of glass filaments 14 flowing from the die 1. The Venturi device 13 assures the projection of the thermoplastic sheet 10 into the sheet of already coated glass filaments 14, while keeping the thermoplastic filaments separated. On the other hand, the Venturi device 13 does not give any supplementary speed to the sheet 10, with the result that a minimum of compressed air is projected onto the sheet of glass filaments. In this way, risk of perturbations in the sheet of glass filaments resulting from the feed of compressed air in addition to the projection of the thermoplastic filaments is as far as possible limited.

Opposite the Venturi 13 and therefore opposite the projection of the thermoplastic filaments, there is disposed a baffle 15, for example a plate of suitable shape. The baffle plate 15, which is placed behind the sheet of glass filaments 14, enables the passage of the thermoplastic filaments into the sheet of glass filaments 14 to be limited. During the interpenetration of the filaments, the risk of damage or of breakage of the glass filaments is limited by reason of the low mass of the thermoplastic filaments.

After the interpenetration, the thermoplastic filaments are, naturally, entrained in the same direction as the sheet of glass filaments by the induced effect of descending air, by gravity, by gripping between the glass filaments, by winding up, crossing and friction between the two types of filament.

It is possible to modify this device slightly by incorporating a supplementary guide roller 27, possibly motor-driven, and a supplementary presser roller 17. The modified device is shown in FIG. 1b. The thermoplastic filaments are now mixed with the glass filaments in such a way that the junction of the two sheets takes place on a generatrix of the presser roller 17. In FIG. 1b, the thermoplastic filaments are mixed with the glass filaments by another technique, which consists of guiding the thermoplastic filaments between a guide roller 27 and the presser roller 17, where the mixing with the glass filaments takes place. This guiding technique has the advantage of very clearly defining the geometry of the sheet of thermoplastic filaments and therefore makes possible a very homogenous mixing with the glass filaments.

The assembly of the glass filaments and thermoplastic filaments then passes onto a device 16, which enables these filaments to be assembled together to form a composite thread 6. This composite thread 6 is now immediately shaped onto a spool 3 by a device, now shown here, which enables the glass filaments to be drawn at a given linear speed, which is kept constant to ensure the desired mass per unit length.

According to the present invention, the speed given to the sheet 10 by the drum-type drawing device 11 is greater than the speed given by the drawing device for the glass filaments. In this way, during the interpenetration of the filaments, the thermoplastic filaments arrive at a speed higher than that of the glass filaments. The installation according to this invention in fact enables an overdrawing of the thermoplastic filaments to be created at the time of mixing with the glass filaments. The composite thread 6 produced is thus initially composed of linear glass filaments and of thermoplastic filaments possessing undulations. The amplitude of these undulations depends upon the additional speed communicated to the thermoplastic filaments, that is to say upon the difference in speed between the speed of the drawing device 11 and the drawing speed of the device forming the spool 3. The greater this difference in speed is, the greater will be the amplitude of the undulations which the thermoplastic filaments possess. It is thus possible, knowing the nature of the thermoplastics material and therefore its shrinkage, to fix this difference in speed in such a way as to obtain a composite thread 6 comprising, after shrinkage, an assembly of linear filaments. It is also possible to fix it in such a way as to obtain a composite thread 6 of high filling capacity which still possesses, after shrinkage, undulating thermoplastic filaments. This last type of composite thread is of advantage, notably, for certain applications in weaving, because it gives a thickness to the fabric.

This technique therefore leads to the formation of spools of composite threads which, in contrast to these hitherto produced, do not any longer have undulations due to the glass filaments and can be unreeled without problems. It is also possible, as the spools no longer deform, to remove the core tube, which can then be reused, and to unreel the spools from the inside. On the other hand, the glass filaments remain linear and can fully fulfil their function as a unidirectional reinforcement, when this is desired, in components made from these composite threads.

Figure 1B:
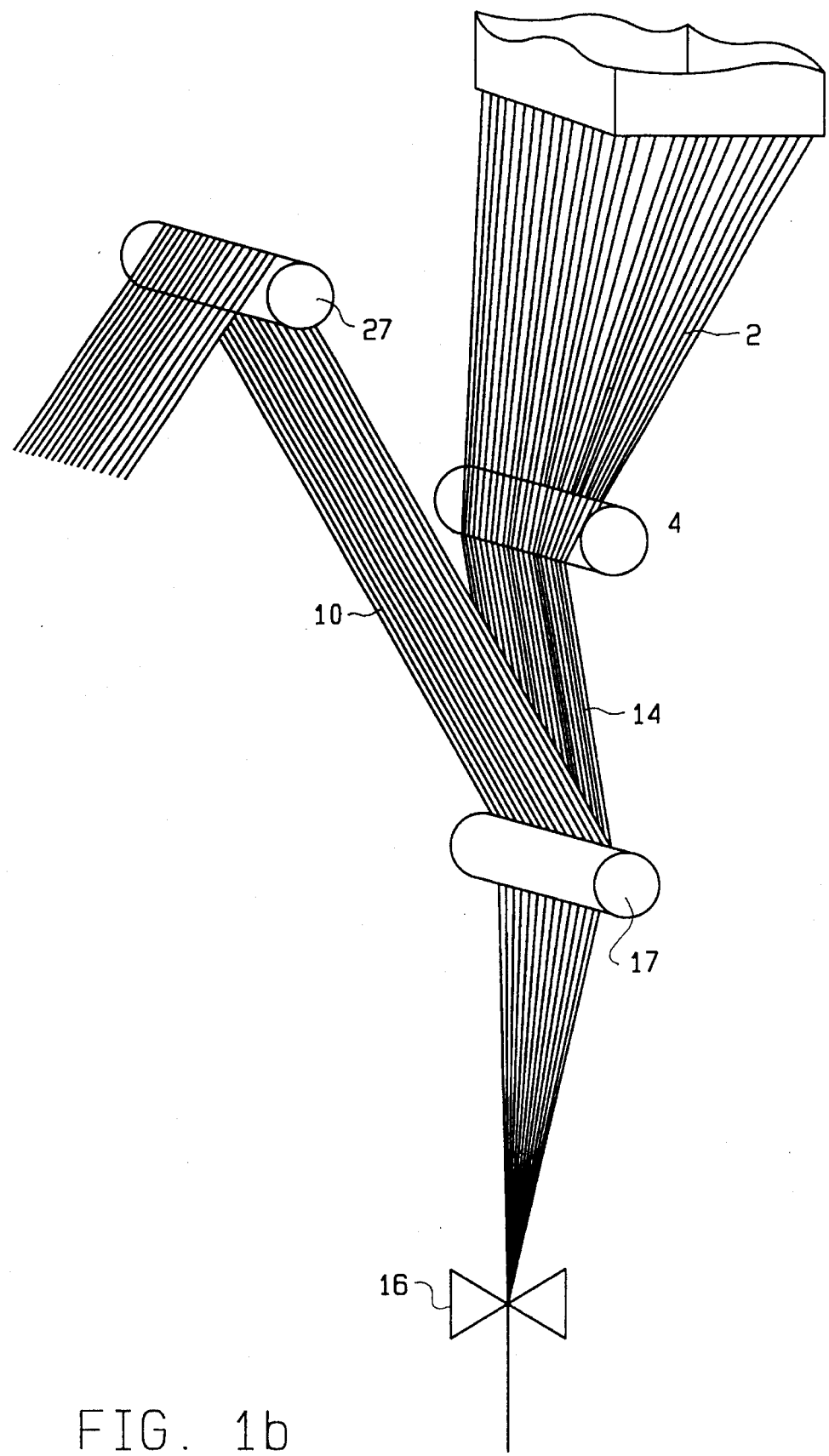
FIGS. 1 *a, b* are schematic representations of an apparatus according to this invention.
Figure 2:
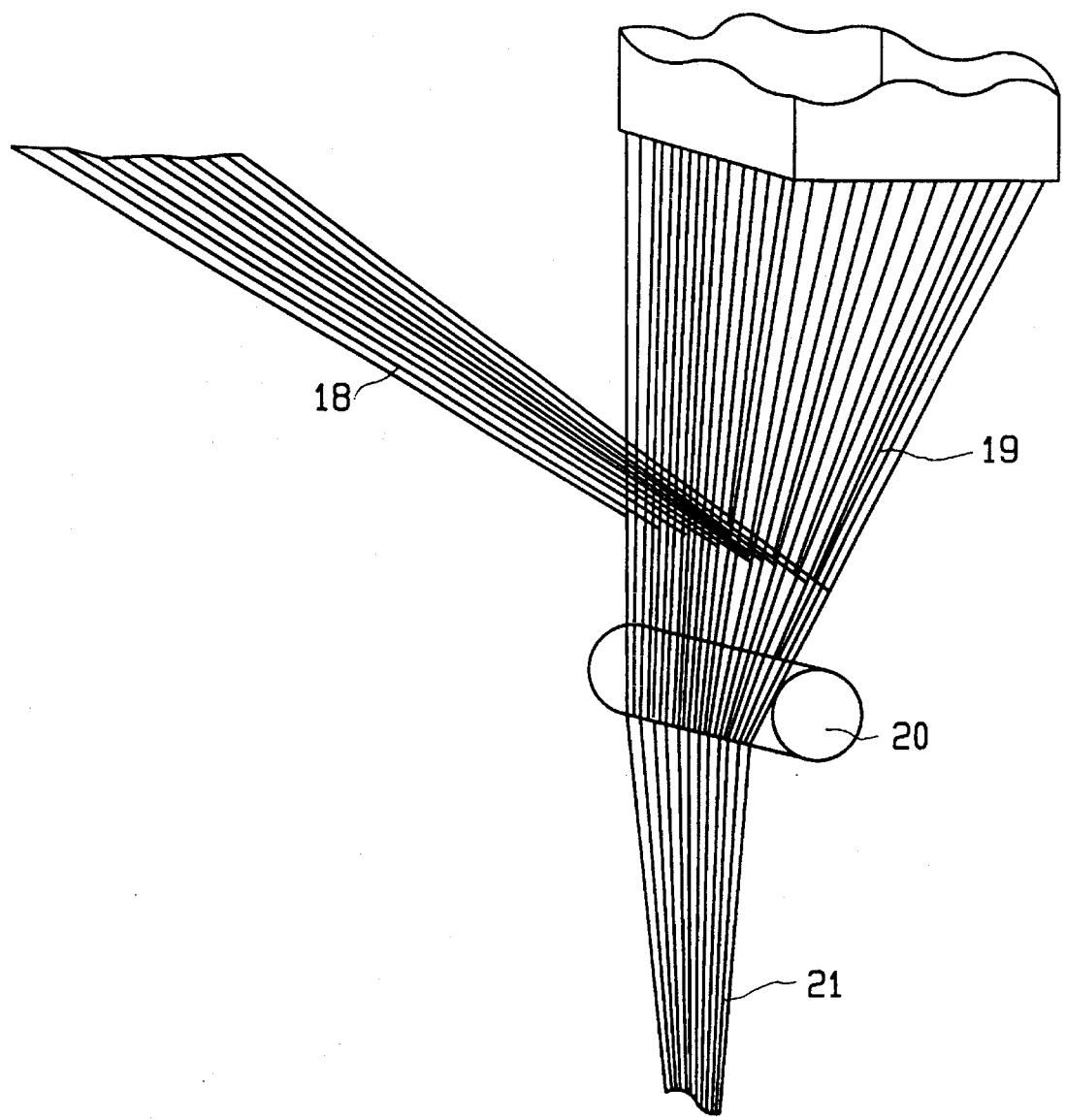
FIG. 2 is a schematic representation of a second embodiment of the invention.

In the representation of the installation given in FIGS. 1a and b, the thermoplastic filaments are mixed with the glass filaments which have already been coated and assembled in the form of a sheet. Another possible realization, shown in FIG. 2, consists of projecting the thermoplastic filaments onto the glass filaments between the die and the coating roller. For this purpose the roller 12, the Venturi 13 and the baffle 15, which are not shown in FIG. 2, are arranged differently from FIG. 1a. According to this other configuration, the sheet 18 of thermoplastic filaments is projected into a bundle of glass filaments 19. The glass filaments do not define, as previously, a surface, but a volume. This installation therefore no longer allows a sheet-to-sheet mixing, but mixing of a sheet with a volume, which leads to a homogenization which can be much better than in the preceding case. In contrast, the projection of the thermoplastic filaments onto the glass filaments before the latter have been coated or sized may increase the risks of breakage. The mixture of filaments then passes onto a coating roller 20 and coats the entirety of the filaments with a coating or sizing solution. After passing onto the roller 20, the whole assembly of the filaments is in the form of a sheet 21, which thereafter passes onto a device, not illustrated, for assembling the filaments in the form of a composite thread, which is would onto a drawing device, also not shown here.

Figure 3:
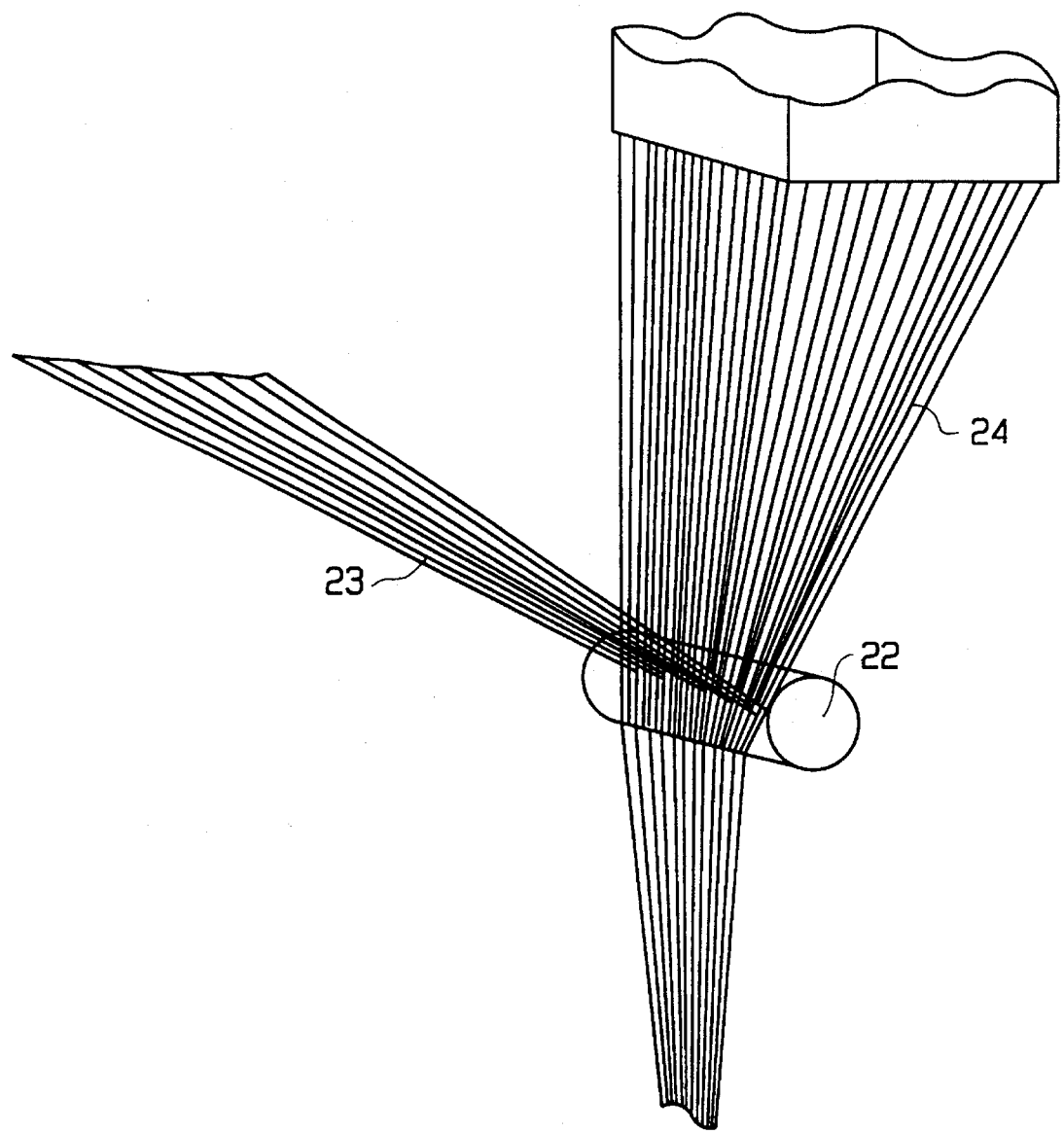
FIG. 3 is a schematic representation of a third embodiment of the invention.

FIG. 3 describes a device enabling the assembling to take place in an intermediate zone, that is in the zone of the coating roller 22. The assembling together of the sheet of thermoplastic filaments 23 with the glass filaments 24 takes place on a generatrix of the coating roller at the instant at which the glass filaments 24 take the form of a sheet. This device enables the risks of breakage from a projection into a bundle of filaments to be avoided and optimizes the homogenization of the intermixing of the filaments during the mixing of the thermoplastic filaments with a sheet of glass filaments. In fact, the sheet of glass filaments which converges towards the assembling point has its greatest width as it is being formed, that is to say on the coating roller. And this greater width, which corresponds to the largest intervals between two glass filaments, assures the most homogenous mixing possible of the filaments during projection. This configuration enables a mixing of the filaments by projection by means, for example, of a Venturi device, or by guidance by means of a guide roller. It also avoids the use of a baffle plate, because the function of the latter can be fulfilled by the installation which surrounds the coating roller.

Figure 4A:
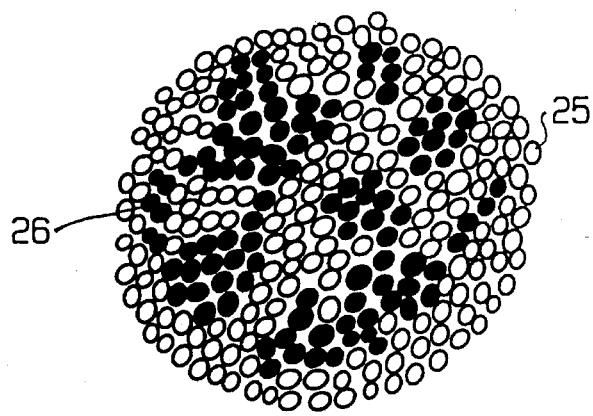
FIGS. 4 *a, b, c* are schematic representations of cross-sections through composite threads produced according to the invention and according to the earlier techniques.
Figure 4B:
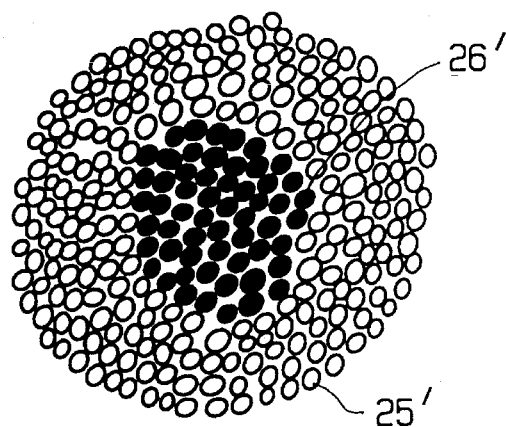
Figure 4C:
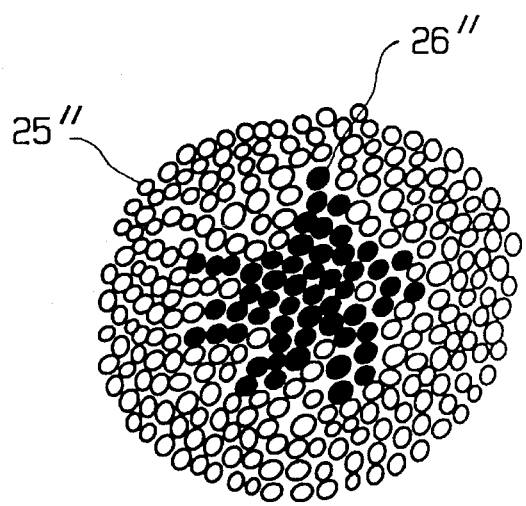

FIGS. 4 a, b, c show schematically cross-sections through composite threads produced by different processes. FIG. 4a is a representation of a section through a composite thread produced according to the present invention. A homogenous distribution of the thermoplastic filaments 25 and of the glass filaments 26 can be observed. A good homogenization of the composite thread leads to better cohesion of the composite thread. FIGS. 4b and 4c show cross-sections through composite threads produced by other processes, such as the use of an annular thermoplastics die, either by association of thread to sheet (FIG. 4b) or by association of sheet to sheet (FIG. 4c). In both these cases the distribution of the filaments is less homogeneous and the core of the thread is a preferential zone for the glass filaments 26', 26", whereas the thermoplastic filaments 25', 25", are more towards the periphery. It will be noted that the sheet-to-sheet assembly leads to better homogeneity.

It is possible to provide several modifications to the devices described. First, the coating solution may contain a photoinitiator, capable of initiating a chemical transformation of the coating substance under the action of actinic radiation. Such a coating enables the cohesion of the composite thread to be still further increased. To carry it out, it is only necessary to provide, along the path followed by the composite thread, a source of radiation of the ultraviolet type between the assembling device and the device enabling a spool to be produced. A thermal initiator may also be used, which is activated by thermal treatment.

It is also possible to associate the invention with the production of complex composite threads, that is to say of composite threads comprising different thermoplastic organic materials. For this purpose, it is possible to project filaments of different kinds produced, for example, from several drawing heads, and pre-assembled before projection onto the glass filaments.

We claim:

1. Process for the production of a linear composite thread (6), formed by the association of continuous glass filaments (2, 19, 24) issuing from a die (1) and moving along a first path at a first speed and of continuous thermoplastic filaments of thermoplastic organic material (5, 10, 18, 23) issuing from at least one drawing head (7) and moving along a second path at a second speed, said thermoplastic filaments having a shrink characteristic whereby they each shrink a predetermined amount lengthwise thereof after issuing from said at least one drawing head (7), said process comprising the steps of:

a) moving the glass filaments along said first path, first as a bundle of glass filaments spaced from each other laterally in two directions and then as a sheet with the glass filaments spaced from each other laterally in only one direction;

b) mixing the thermoplastic filaments (10, 18, 23), before shrinking thereof, with the glass filaments (2, 19, 24) by moving the thermoplastic filaments (10, 18, 23) along said second path in the form of a sheet and into said bundle or sheet of glass filaments (2, 19, 24) so as to penetrate into said bundle or sheet of glass filaments (2, 14, 19, 24) to thereby form a composite thread possessing undulations; and c) maintaining the speed of the thermoplastic filaments (10, 18, 23) greater than the speed of the glass filaments (2, 19, 24) as the thermoplastic filaments (10, 18, 23) pentrate the glass filaments (2, 19, 24), said speed of the thermoplastic filament being greater than the speed of the glass filaments by an amount correlated to said shrink characteristic of said thermoplastic filaments whereby the lengths of the thermoplastic filaments and glass filaments substantially equal each other in said linear composite thread after shrinkage of said thermoplastic filaments by said predetermined amount.

2. Process according to claim 1, wherein:

a) the thermoplastic filaments (18) are mixed with the bundle (19) of glass filaments between the die (1) and a coating device (20) for said glass filaments (19), which coating device (20) is spaced along said first path from said die (1).

3. Process according to claim 1, wherein:

a) the glass filaments (24) are coated by passing them over a coating device defined by a coating roller (22); and b) the thermoplastic filaments (23) are mixed with the glass filaments (24) on the generatrix of a coating roller (22), where the glass filaments (24) are coated.

4. Process according to claim 1, wherein:

a) the thermoplastic filaments (10) are mixed with the sheet (14) of glass filaments (2) downstream of a coating roller (20) for said glass filaments (2), which coating roller (20) is spaced along said first path from said die (1).

5. Process according to any one of claims 1 to 4, wherein:

a) the speed of the thermoplastic filaments (10, 18, 23) is controlled to obtain a predetermined volume of thermoplastic filaments (10, 18, 23) in the composite thread per unit length along the glass filaments (2, 19, 24) in the composite thread.

6. Process according to any one of claim 1 to 4 wherein:

a) the thermoplastic filaments (10, 18, 23) are projected in the air along said second path in the form of a sheet onto a bundle or sheet of glass filaments (2, 19, 24).

7. In a device for the production of a composite thread (6) formed by the association of continuous glass filaments (2, 19, 24) and of continuous thermoplastic filaments (10, 18, 23) of thermoplastic organic material, the device comprising at least one die (1) supplied with glass and having a lower face which is provided with a multiplicity of orifices for issuing said glass filaments (2, 19, 24) for movement along a first path at a first speed, a coating device (4, 20, 22) for said glass filaments (1, 19, 24), at least one drawing head (7) supplied with molten thermoplastic material and having a lower face which is provided with a multiplicity of orifices for issuing said thermoplastic filaments (10, 18, 23) for movement along a second path, said thermoplastic filaments having a shrink characteristic whereby they each shrink a predetermined amount lengthwise thereof after issuing from said at least one drawing head (7), and means (3, 16) for assembling together the glass filaments (2, 19, 24) and thermoplastic filaments (10, 18, 23) into the composite thread (6), the improvement comprising:

a) a drawing device (11) for feeding the thermoplastic filaments (10, 18, 23) along said second path at a speed greater than the speed of the glass filaments (2, 19, 24)),.said speed of the thermoplastic filament being greater than the speed of the glass filaments by an amount correlated to said shrink characteristic of said thermoplastic filaments such that the composite thread initially possesses undulations whereby the lengths of the thermoplastic filaments and glass filaments substantially equal each other in said composite thread after shrinkage of said thermoplastic filaments by said predetermined amount; and b) mixing means (13, 17, 27) for mixing the thermoplastic filaments (10, 18, 23) with the glass filaments (2, 19, 24) before shrinking thereof and while said thermoplastic filaments (10, 18, 23) are moving at said greater speed to form said composite thread.

8. Device according to claim 7, wherein:

a) the orifices of said at least one die (1) are spaced from each other to issue said glass filaments (2, 19, 24) spaced from each other laterally in two directions to form a bundle of glass filaments (2, 19, 24);

b) a first roller (4, 20) positioned along said first path for directing said glass filaments (2, 19, 24) into a sheet (14) with the filaments thereof spaced from each other in only one direction laterally of said first path.

9. Device according to claim 1, wherein:

a) the mixing means (13, 27) is positioned between said at least one die (1) and said first roller (20) for mixing said thermoplastic filaments (18) with said bundle (19) of glass filaments (2, 19, 24).

10. Device according to claim 8, wherein:

a) the mixing means (13, 17, 27) is positioned downstream of said first roller (4) for mixing a sheet (10) of said thermoplastic filaments (10, 18, 23) with said sheet (14) of glass filaments (2, 19, 24).

11. Device according to claim 10, wherein:

a) the mixing means (27) further includes a second roller (17) positioned along said first path downstream of said first roller (4) for pressing a sheet (10) of thermoplastic filaments (10, 18, 23) into said sheet (14) of glass filaments (2, 19, 24).

12. Device according to any one of claims 7–10, wherein:

a) the mixing means is a Venturi device (13) for projecting the thermoplastic filaments (10, 18, 23) into the path of the glass filaments (2, 19, 24).

13. Device according to claim 12, further comprising:

a) a baffle (15) spaced in front of the Venturi device (13) with the path of the glass filaments (2, 19, 24) extending between the Venturi device (13) and the baffle (15).

\* \* \* \* \*